(12) United States Patent
Lejin P J

(10) Patent No.: US 12,177,361 B2
(45) Date of Patent: Dec. 24, 2024

(54) AVOIDING INFORMATION DISCLOSURE ABOUT USER ACTIONS ON CONFIGURATION DATA SUBMISSIONS IN MULTI-TENANT NETWORK MANAGEMENT INTERFACES

(71) Applicant: Salesforce, Inc., San Francisco, CA (US)

(72) Inventor: Jose Lejin P J, Karnataka (IN)

(73) Assignee: Salesforce, Inc., San Francisco, CA (US)

( * ) Notice: Subject to any disclaimer, the term of this patent is extended or adjusted under 35 U.S.C. 154(b) by 144 days.

(21) Appl. No.: 17/963,641

(22) Filed: Oct. 11, 2022

(65) Prior Publication Data

US 2024/0121105 A1  Apr. 11, 2024

(51) Int. Cl.
*H04L 9/32* (2006.01)
*H04L 9/08* (2006.01)
*H04L 41/085* (2022.01)

(52) U.S. Cl.
CPC .......... *H04L 9/3247* (2013.01); *H04L 9/0869* (2013.01); *H04L 41/085* (2013.01)

(58) Field of Classification Search
CPC .... H04L 9/3247; H04L 9/0869; H04L 41/085
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |

(Continued)

*Primary Examiner* — Frantz B Jean

(74) *Attorney, Agent, or Firm* — Sterne, Kessler, Goldstein & Fox P.L.L.C.

(57) ABSTRACT

Techniques are provided for thwarting attackers in a computing system which uses network management interfaces (NMIs). Before submitting NMI form data, a user computing device queries a server using a user id to obtain a signature which defines a shuffling map and random data such as a random key. The NMI form data is divided into portions and the random data is appended to each portion to provide respective data units, or buckets of data. The data units are then shuffled according to the shuffling map before being transmitted to a server, with the signature or an identifier of the signature included in a header. At the server, the data units are unshuffled to recover the data units, and the random data is removed to recover the form data portions. The instructions of the form data can then be executed.

20 Claims, 12 Drawing Sheets

(56) References Cited

U.S. PATENT DOCUMENTS

| | | |
|---|---|---|
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 11,520,459 B1 | 12/2022 | Lejin P J |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |

(56) References Cited

U.S. PATENT DOCUMENTS

| | | |
|---|---|---|
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2019/0361842 A1* | 11/2019 | Wood ................... G06V 30/418 |
| 2019/0386819 A1* | 12/2019 | Ertl ..................... G06F 11/3082 |
| 2020/0065464 A1* | 2/2020 | Dharmarajan .......... G06F 21/33 |
| 2022/0277098 A1* | 9/2022 | Flint .................... G06F 21/602 |
| 2024/0113728 A1* | 4/2024 | Cooper ............... H03M 7/4056 |

* cited by examiner

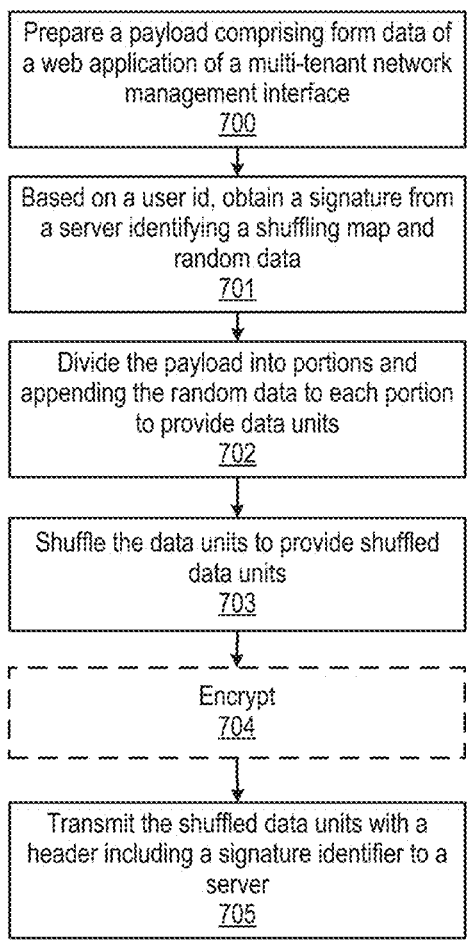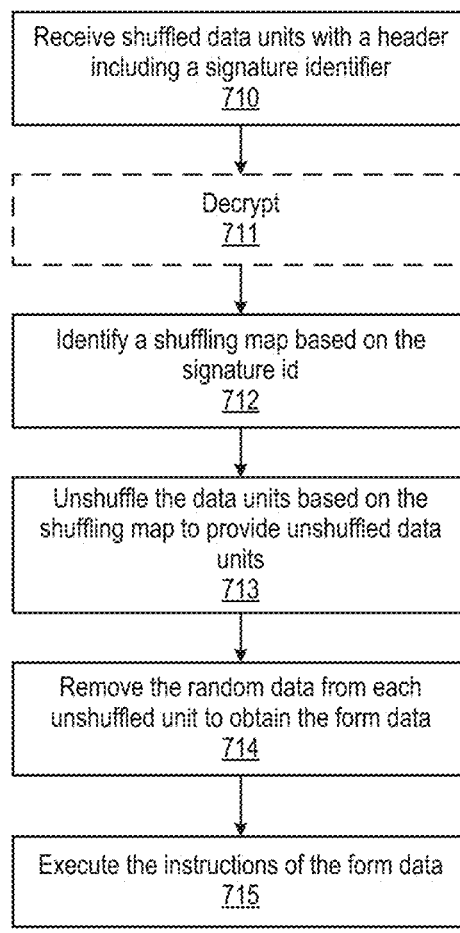
Figure 7A
Figure 7B

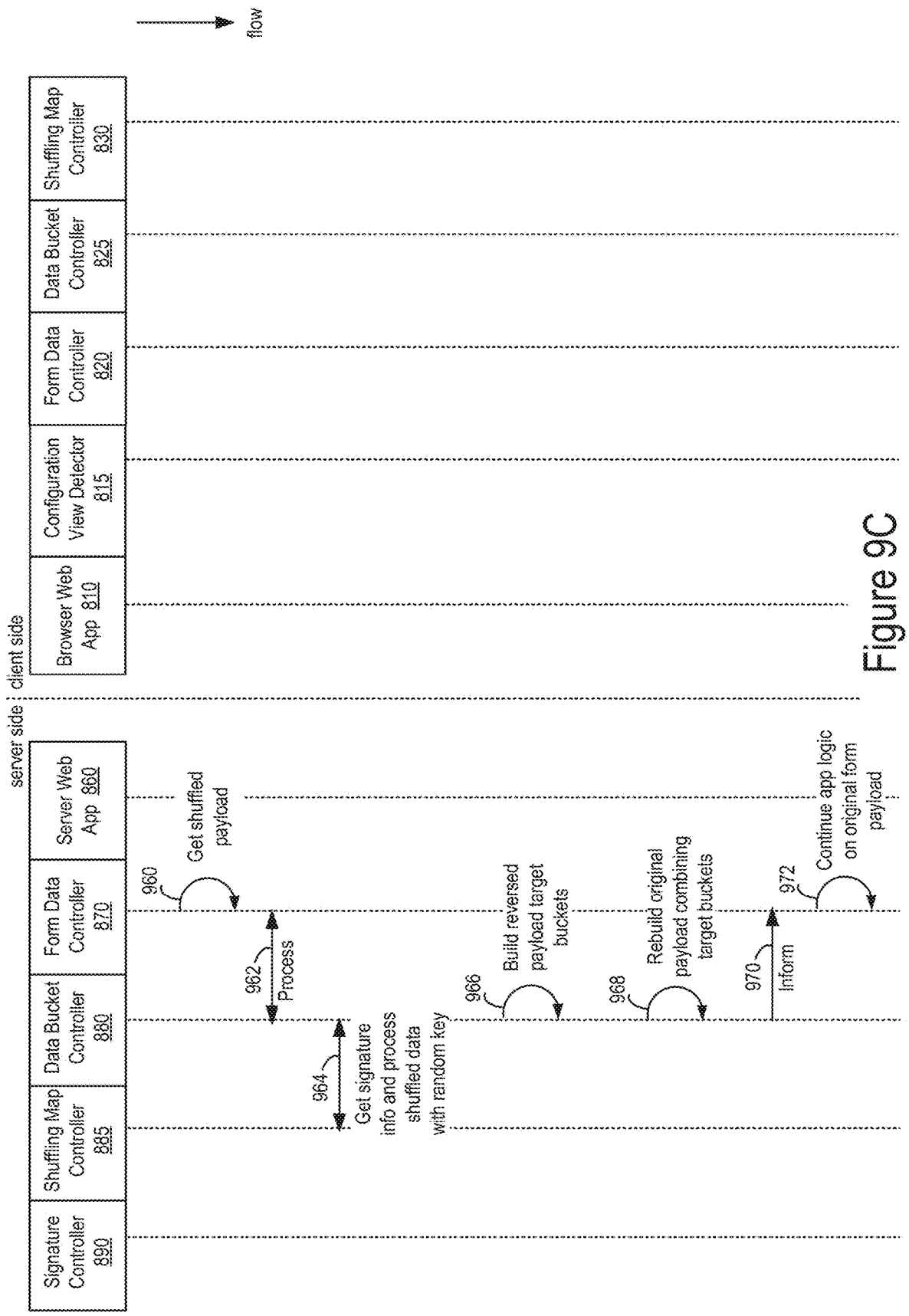

AVOIDING INFORMATION DISCLOSURE ABOUT USER ACTIONS ON CONFIGURATION DATA SUBMISSIONS IN MULTI-TENANT NETWORK MANAGEMENT INTERFACES

TECHNICAL FIELD

One or more implementations relate to the field of configuring network devices; and more specifically, to techniques for avoiding information disclosure about user actions in configuration data submissions in multi-tenant network management interfaces.

BACKGROUND ART

When a computer network is built or modified, various network devices and cloud solutions need to be configured so that they can operate properly. Devices can include, e.g., personal computers (PCs), laptops, application servers, database servers, gateways, load balancers, routers etc. A cloud solution refers to, e.g., applications, storage, on-demand services, computer networks, or other resources that are accessed with an internet connection through another provider's shared cloud computing framework. Cloud computing is the delivery of computing services such as servers, storage, databases, networking, software, analytics, and intelligence on a pay as you go basis.

In one approach, a network administrator accesses Network Management Interfaces (NMIs) associated with the devices or cloud solutions. For example, a different NMI may be used for each device manufacturer or type. In some cases, a team of network administrators is involved in configuring the devices/cloud solutions. The devices/cloud solutions are configured with data such as Internet Protocol (IP) address, port number, Secure Sockets Layer (SSL) certificates etc. However, various challenges are presented in maintaining the security of the configuration process.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 7A depicts an example process at the user computing device 210 for transforming form data into transmit data, consistent with FIGS. 1 to 6B, according to some example implementations.

FIG. 7B depicts an example process at the server 130 for recovering form data from transmit data, consistent with FIG. 7A, according to some example implementations.

FIG. 9C depicts a third part of an example process flow, following FIG. 9B, according to some example implementations.

DETAILED DESCRIPTION

Figure 1:
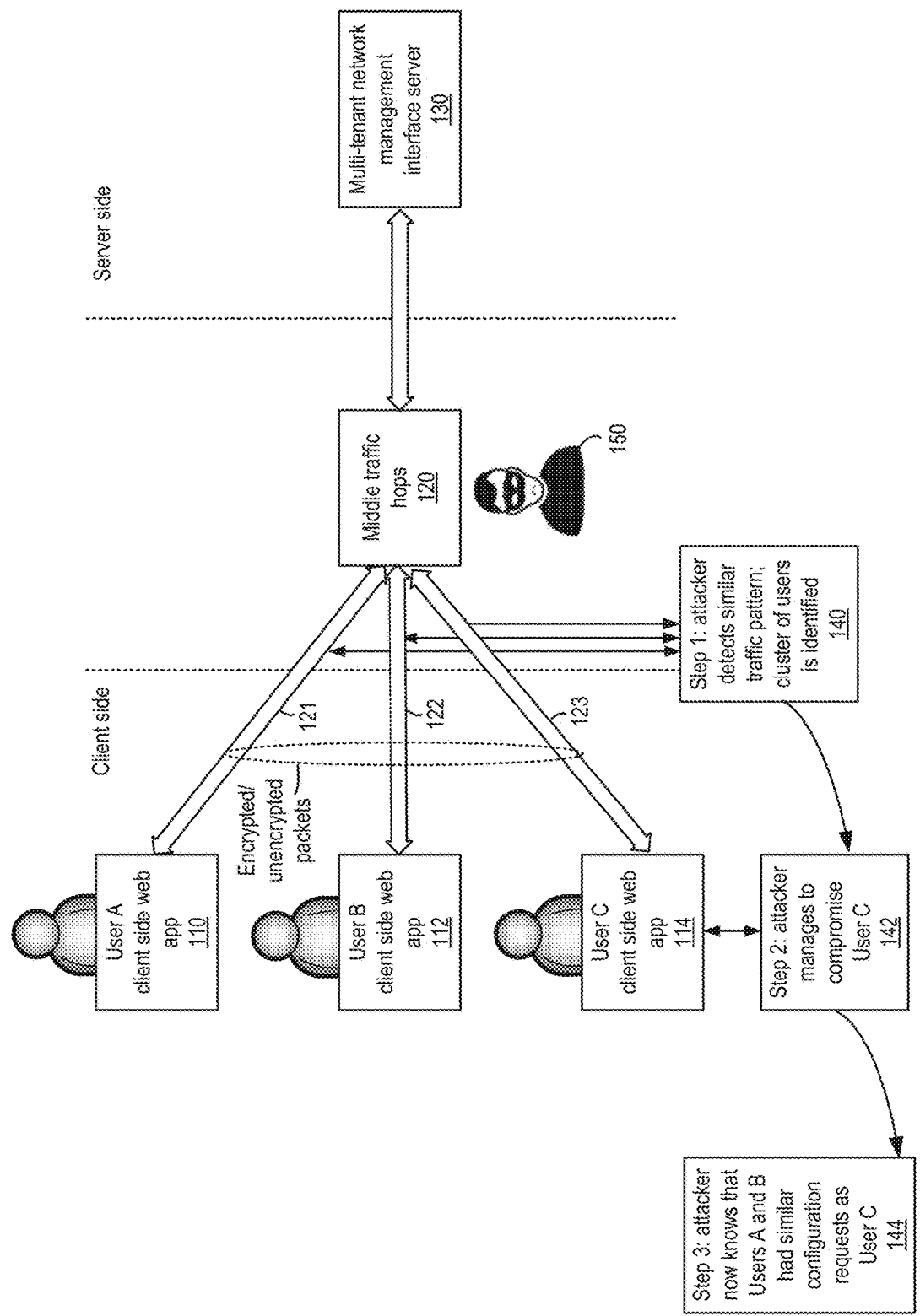
FIG. 1 is a block diagram of an example scenario in which an attacker can observe similar traffic patterns from different users of a multi-tenant network management interface (NMI), according to some example implementations.

The following description describes technologies for avoiding information disclosure about user actions in configuration data submissions in multi-tenant network management interfaces.

A number of network devices/cloud solutions can be configured via web application user interfaces, referred to as Network Management Interfaces (NMIs). A typical NMI is a user interface which allows the user to enter data in one or more fields of a form, then submit the form to a server to carry out the desired configuration. Most of these kinds of web applications enable the configuration via web application (app) forms using REST (Representational State Transfer)/Application Programming Interface (API) endpoints. Moreover, many of these NMI solutions are multi-tenant. This means different users can configure different aspects of a device/cloud solution based on their requirements in a common backend.

A multi-tenant architecture is a software architecture where a single software instance can serve multiple, distinct user groups. Examples of multi-tenant NMI solutions include public cloud solutions such as Amazon Web Services (AWS), Azure Web Apps and Google Cloud Platform (GCP). AWS is a comprehensive, evolving cloud computing platform provided by Amazon that includes a mixture of infrastructure as a service (IaaS), platform as a service (PaaS) and packaged software as a service (SaaS) offerings. Azure Web Apps is a cloud computing based platform for hosting websites, created and operated by Microsoft. It is a platform as a service which allows publishing web apps running on multiple frameworks. GCP is a suite of cloud computing services. It provides a set of management tools and a series of modular cloud services including computing, data storage, data analytics, machine learning etc.

The NMIs include forms which are filled out by end users to perform various configuration actions. Typically, security is by default provided for form data submissions which are sent from the client to the server endpoint by encrypting the data. For a single form submission, the encryption makes it very difficult or impossible for an attacker to capture the information in the submission. An attacker can be defined, e.g., as a person or other entity such as a computer program that attempts to cause harm to an information system such as through unauthorized access to information in the system. However, for multi-tenant NMIs, there is a significant likelihood that many users will configure the exact same configuration via form data submissions. For example, first and second users may configure a load balancer or settings using the exact same configuration.

Normally, end users access an NMI web app in a client side browser via middle traffic components such as a load balancer, gateway, Content Delivery Network (CDN) or internet service provider. However, these components provide opportunities for attackers to intercept the traffic and perform deep inspection of packets, whether or not they are encrypted. For example, deep packet inspection (DPI), also known as packet sniffing, can involve examining the contents of data packets as they pass by a checkpoint on a network. It is an advanced method of examining network traffic and can identify packets with specific data or code in payloads or headers.

Furthermore, many systems use weaker, legacy encryption techniques. Attackers can use many available methods, including machine learning techniques, to analyze such encrypted packets for deep packet inspection (DPI).

As mentioned, in a multi-tenant system, multiple users may transmit packets to a server to carry out similar configuration processes. However, an attacker can intercept the packets in middle traffic hops, and perform a deep inspection of the packets. The attacker may be able to detect patterns in the data and therefore identify clusters of users. If the attacker can compromise just one of the users in the identified cluster, the other users are similarly subject to being compromised. This is a dangerous information disclosure, which can lead to compromising all user data, resulting in a significant privacy breach.

One possible solution is to provide each user with a private signature, such as a Secure Sockets Layer (SSL) certificate, and sign it on the form data configuration submission so that the payloads of different users never match even for very similar configuration data. However, this is complicated and expensive to maintain by the app owners. Also, the configuration needed for this kind of infrastructure is complicated for large multi-tenant systems and difficult to maintain.

The techniques disclosed herein address the above and other issues. In an example implementation, before submitting NMI form data, a client computing device queries a server using a user id to obtain a signature. A set of signatures can be pre-configured, e.g., before they are used in a form data submission, and cross-referenced to the user id. The signature defines a shuffling map and random data such as a random key. The NMI form data is divided into portions, e.g., in buckets of data, and the random data is appended to each portion to provide respective data units. The data units are then shuffled according to the shuffling map before being transmitted to the server. The signature id can be included in a header when transmitting the data to the server. The server receives the data and uses the signature to identify the shuffling map. The shuffled data units are unshuffled to recover the original sequence of data units, and the random data is removed to recover the form data portions. The instructions of the recovered original form data can then be executed to carry out the desired configuration action.

In a subsequent form data submission, a different signature can be used.

The techniques provide a number of advantages. For example, the techniques avoid information disclosure regarding configuration data submissions by users in a multi-tenant NMIs. The techniques are generic to any NMI web app. The techniques provide a lightweight, pluggable total end-to-end solution for web applications, including the server and client sides. The techniques protect user privacy, even if matching same configurations are performed by other users in a common multi-tenant system.

The techniques randomize form data submission for configurations performed in NMIs. For example, a random bucket shuffling technique, along with a random key, can be used to randomize the form data so that the data of different users never follows a similar pattern even if these users submit the exact same form data, regardless of whether the data is encrypted or unencrypted. This allows for randomizing on the client side and restructuring back to the original data at the server side. In one approach, the users are allowed to configure any number of random bucket signatures as needed.

Moreover, the randomizing approach is scalable and works with any data length of payloads of form data submission or other data.

The techniques avoid information disclosure regarding configuration data submissions without requiring use of legacy private signature techniques.

The techniques can dynamically choose user-configured signatures for randomizing the form data payload and make sure each submission looks random, even if the same settings are configured by the end user in the same form again.

With these techniques, even if the packet is deep inspected by an attacker in the middle of the traffic, no pattern can be detected in the configuration payloads. Finally, the techniques work well regardless of whether the traffic is encrypted or unencrypted, and are compatible with any kind of web app and web browser.

These and other advantages will be further apparent in view of the following discussion.

FIG. 1 is a block diagram of an example scenario in which an attacker can observe similar traffic patterns from different users of a multi-tenant network management interface (NMI), according to some example implementations. The scenario includes a client side where users of a multi-tenant NMI are submitting configuration forms to one or more servers. Three example users are represented by a User A client side web app 110, a User B client side web app 112, and a User C client side web app 114. Generally, two or more users may be involved.

Middle traffic hops 120 can include, e.g., a gateway, load balancer, a CDN or an internet service provider. The middle traffic hops 120 communicate with the users via respective paths 121, 122 and 123. The traffic on the paths can include encrypted or unencrypted packets. The middle traffic hops 120 further communicate with a server side which includes a multi-tenant NMI server 130. Generally, one or more servers can be used.

In an example attack, an attacker 150 managed to sit at the middle traffic hops. That is, the attacker gains access to the data which is communicated via the middle traffic hops on the paths 121-123. The attacker performs deep inspection of the packets of the network using existing techniques, where the packets represent network management configuration transactions. In step 1 of the attack (box 140), the attacker detects similar traffic patterns on the paths 121-123, and a corresponding cluster of users is detected, e.g., users A, B and C. Note that the traffic patterns can be detected concurrently or at different times. In step 2 of the attack (box 142), the attacker manages to compromise User C using any existing techniques. The attacker therefore identifies configuration requests of User C. In step 3 of the attack (box 144), the attacker now knows that Users A and B had similar configuration requests as User C, since these users had similar traffic patterns. This results in information disclosure and further attacks against these users.

The technique provided herein address this possible attack surface use case problem. The techniques avoid information disclosure to attackers regarding user actions on configuration data submissions in multi-tenant NMIs.

Figure 2:
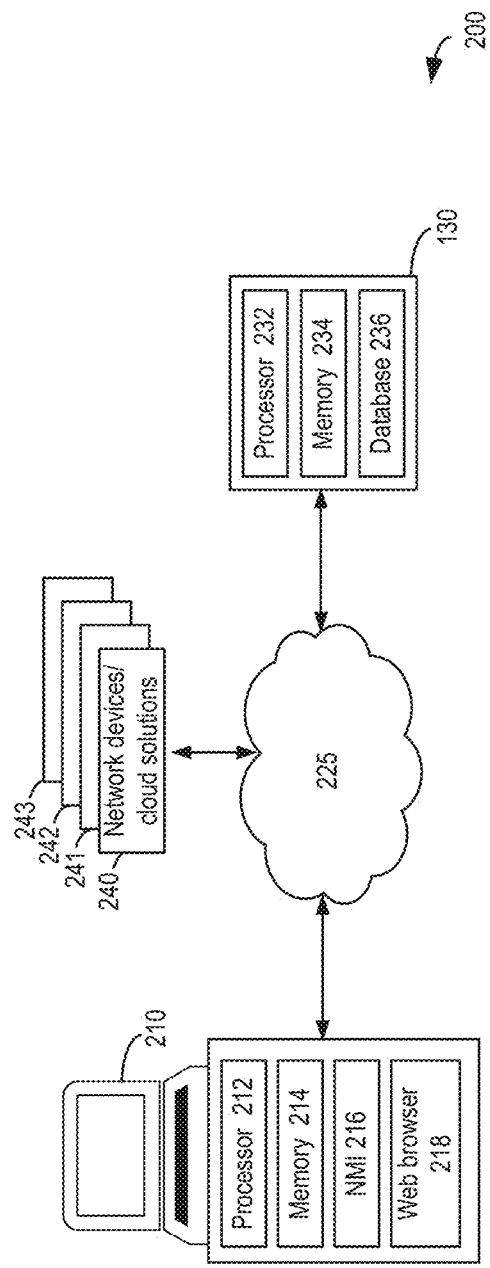
FIG. 2 is a block diagram of an example computing system 200 which includes a user computing device 210 and a server 130, consistent with FIG. 1, according to some example implementations.

FIG. 2 is a block diagram of an example computing system 200 which includes a user computing device 210 and a server 130, consistent with FIG. 1, according to some example implementations. The system includes example network devices 240-243 which are associated with one or more networks 225, such as private or public networks. A private network could be in an organization such as a company or school, while a public network could include the Internet, for example.

Four network devices/cloud solutions are depicted for simplicity. In practice, such networks could have many more devices/cloud solutions. The one or more networks 225 are in communication with one or more administrators (admins), also referred to as users, and their respective computing devices, such as laptop computers or PCs. For example, a user may use a computing device 210 to configure the devices/cloud solutions. In practice, many administrators and their computing devices can work together to configure a network. For example, dozens of administrators can be used in a team to configure a large network. The client computing device 210 includes a processor 212, a memory 214, an NMI program 216 and a Web Browser 218.

The memory 214 can store instructions which are executed by the processor 212 to perform the functions described herein.

The computing device 210 runs software to provide access to one or more NMIs, which can be provided as web applications, in one approach. The NMIs are accessed on the client side and hosted in web servers. A web app is an application program that is stored on a remote server and delivered over the Internet through a web browser. Browsers typically allow a variety of extensions, including user interface modifications, cookie management, ad blocking, and the custom scripting and styling of web pages.

The one or more networks 225 can communicate with one or more servers such as the server 130. The server 130 includes a processor 232, a memory 234 and a database 236. The memory can store instructions which are executed by the processor to perform the functions described herein.

A REST API is at the web app server side. This is the admin or owner side where the web app is hosted. The web app can be hosted inside the network device itself at the web app server side or can be hosted as separate web server.

The database 236 can store configuration data for the network devices, where this data is updated by the computing devices of the administrators when a device is configured. The database can also store signature data for shuffling the form data, as discussed further below.

Figure 3:
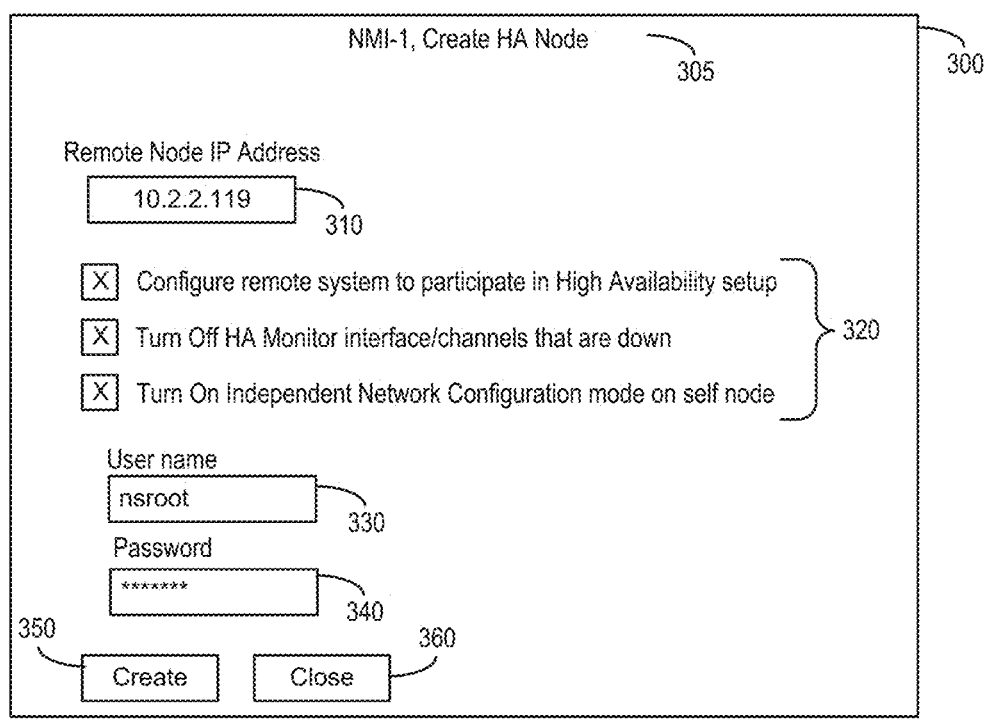
FIG. 3 depicts an example configuration form 300 of the NMI program 216 of FIG. 2, according to some example implementations.

FIG. 3 depicts an example configuration form 300 of the NMI program 216 of FIG. 2, according to some example implementations. The view depicts a form in which the user enters data to configure a network device. In this example, a configuration value such as an Internet Protocol (IP) address is entered in a field 310. The title 305 of the view identifies the NMI (NMI-1) and a description of the function of the view, e.g., "Create HA (High Availability) Node. To achieve high availability for any device, a second node is configured as backup to a first node to ensure high availability if the first node goes down.

A user has entered an IP address 10.2.2.119 in the field 310. One or more users may have configured this same value (configuration value) in the same view of their NMIs. Basically, different users access their NMI instance after their login (they logged-in to NMI from their browser). They may be configuring same IP value in their NMI and submitting.

An area 320 of the view includes check boxes for other features of the configuration.

Additionally, a field 330 is for a user name and a field 340 is for a password. These credentials may be required for the user to confirm the configuration when selecting a "Create" button 350. The user can cancel the view by selecting the "Close" button 360. When the user confirms their entries, the form is submitted to a server to carry out the instructions of the form.

Figure 4:
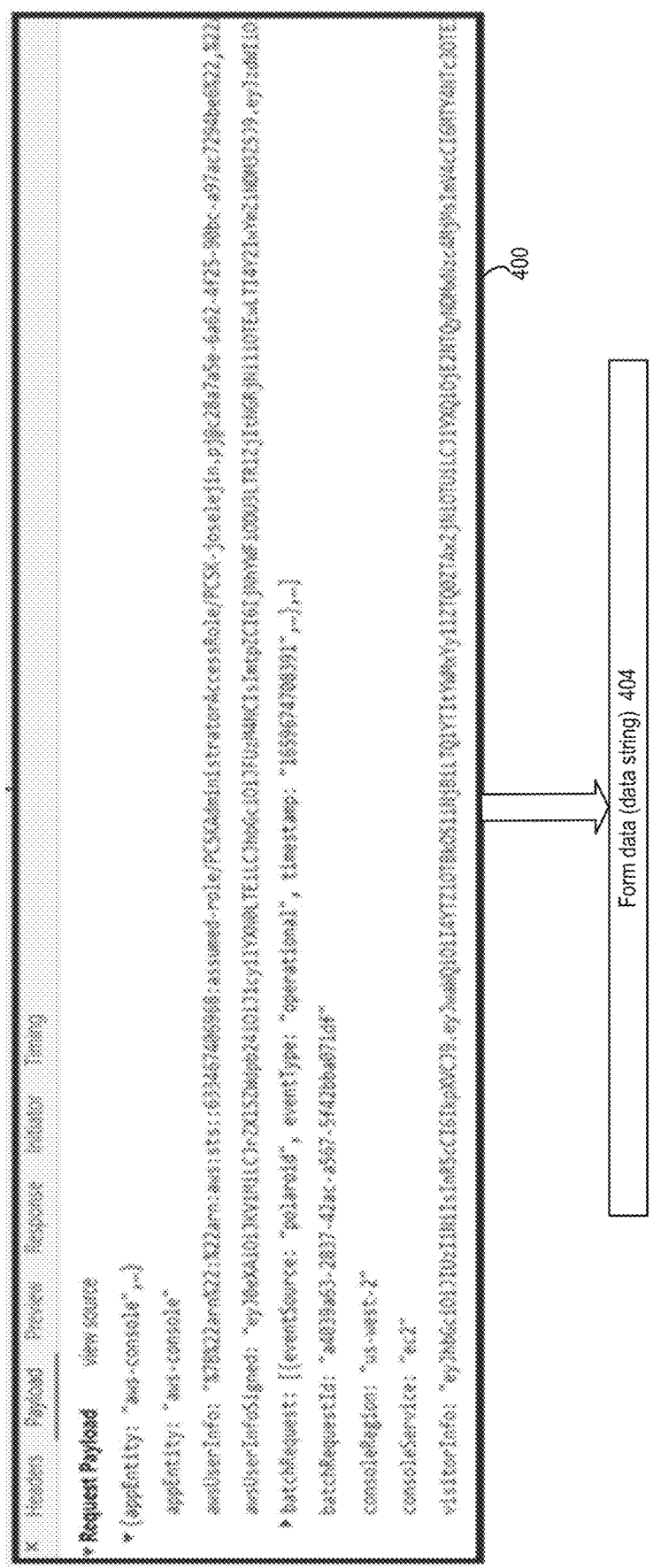
FIG. 4 depicts an example view 400 of configuration form data, according to some example implementations.

FIG. 4 depicts an example view 400 of configuration form data, according to some example implementations. The data is an example from the NMI for AWS and does not necessarily correspond to the form of FIG. 3. It is an example of a configuration form submission data payload. In this diagram, what is seen in via a browser inspected data string. Generally, any tool can be used to view a configuration form data string.

The data comprises code in JavaScript Object Notation (JSON), as an example. JSON is a standard text-based format for representing structured data based on JavaScript Object Notation syntax. It can be used for transmitting data in web applications (e.g., sending some data from the server to the client, so it can be displayed on a web page, or vice versa, from a client to a server).

The JSON data can be converted to a string and we may drop JSON special symbols as needed and leave just text. For example, the conversion can remove opening and closing braces of the JSON code (e.g., the first "{" and the last "}", respectively) and convert the remaining code to string data. A JavaScript object can be converted into a string with the JSON.stringify( ) example method. A block 404 represents a payload of form data as a data string which is obtained from the JSON data code.

As mentioned, if other users submit the same data, an attacker can perform a deep inspection to reveal similarities in the data of the different users.

The techniques herein are not limited to web view forms, but can be used, e.g., with any applications involving configuration forms data submissions and other forms data submissions.

Figure 5:
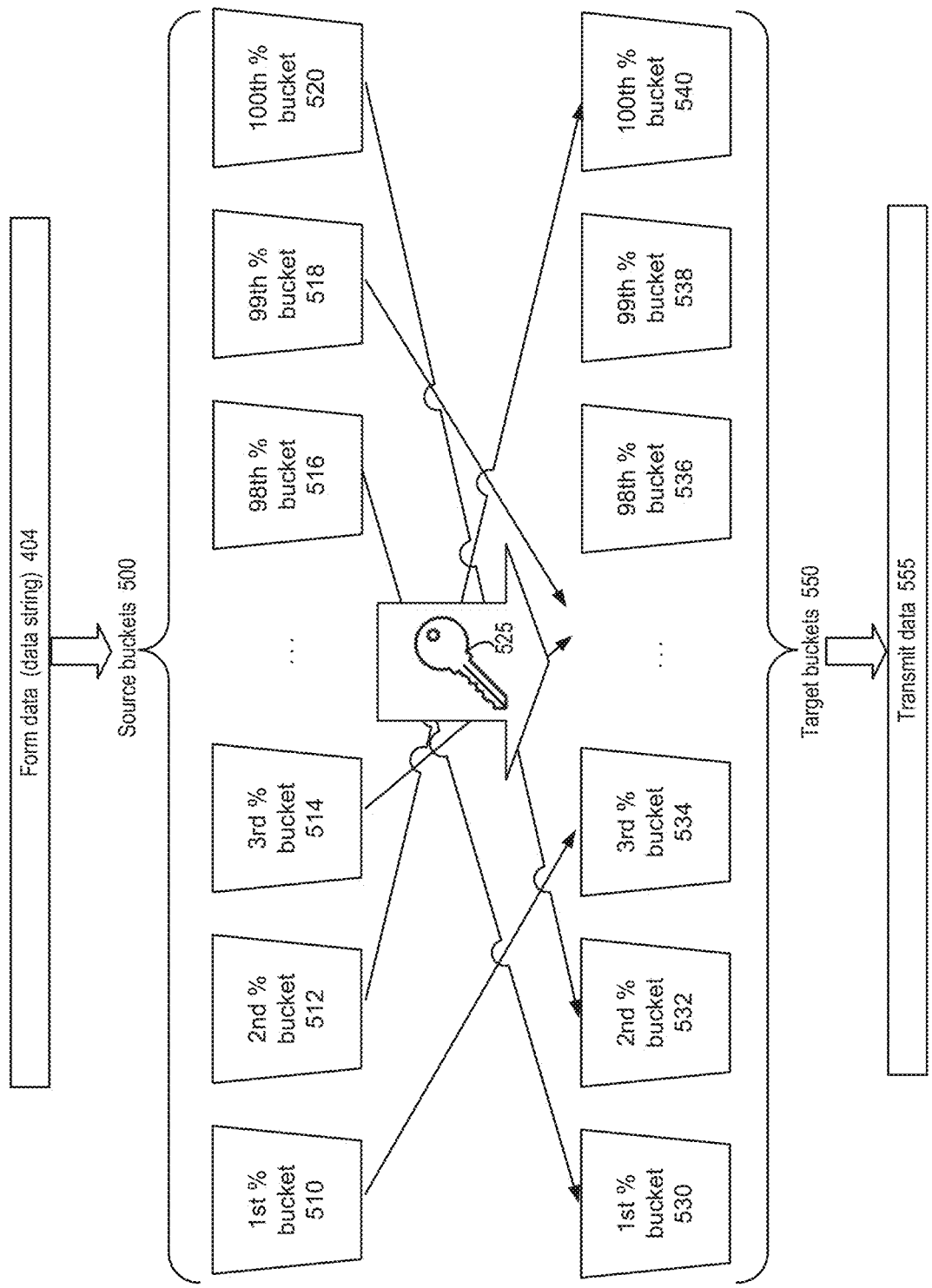
FIG. 5 depicts an example process for transforming the payload of form data (block 404) of FIG. 4 into transmit data, including shuffling buckets of form data and adding random data to each bucket, according to some example implementations.

FIG. 5 depicts an example process for transforming the payload of form data (block 404) of FIG. 4 into transmit data, including shuffling buckets of form data and adding random data to each bucket, according to some example implementations. The string of form data is input to a set of source buckets 500. The buckets represent portions of the form data, such as non-overlapping, adjacent portions of the form data. In this example, there are 100 source buckets, each having a same size, e.g., number of bytes of data. The number of source buckets and their size can be based on the size of the form data. Each source bucket represents an equal amount of data, in one approach, such as 1% of the form data. Generally, with N source buckets, each source bucket can represent 1/Nth of the form data.

The form data of the block 404 may represent a packet which includes all, or a portion, of the form data. If the packet only includes a portion of the form data, other portions of the form data can be assigned to the source buckets and shuffled in a similar manner to provide other packets.

For example, the source buckets 510, 512, 514, . . . , 516, 518 and 520 represent the $1^{st}\%$, $2^{nd}\%$, $3^{rd}\%$, . . . , $98^{th}\%$, $99^{th}\%$ and $100^{th}\%$, respectively, of the original form data 404. For instance, assuming the data string is 1000 bytes long. The data can be placed in the source buckets as follows:

1st %: bytes 1-10
2nd %: bytes 11-20
3rd %: bytes 21-30
. . .
98th %: bytes 981-990
$100^{th}\%$: bytes 991-1000

The key 525 represents a random key or other random data which is appended to each source bucket of data. The random data can be placed before and/or after the form data, for instance. Each source bucket of data has random data added to form a data unit, and the data units are shuffled so that each source data unit is randomly assigned to a target bucket in a set of target buckets 550. The set of target buckets 550 corresponds in number to the set of source buckets 500. Each target bucket may also have a same size as each source bucket, in one approach. For example, the target buckets 530, 532, 534, . . . , 536, 538 and 540 represent the $1^{st}\%$, $2^{nd}\%$, $3^{rd}\%$, . . . , $98^{th}\%$, $99^{th}\%$ and $100^{th}\%$, respectively, of the shuffled form data.

Appending the same random data to each source bucket of data is one approach which minimizes complexity. However, another approach is to append different random data to each source bucket of data, or two or more of the source buckets of data. This increases the degree of randomness since a periodic pattern of the same random data can be avoided. The random data is not used, e.g., is dummy data, and is stripped out by the server, in some example implementations.

Moreover, complexity is minimized by mapping the source buckets to the target buckets on a 1:1 basis, one source bucket per target bucket. However, another approach is to map multiple source buckets to one target bucket. For instance, two source buckets can be mapped to each target bucket, where each target bucket is twice the size of a source bucket. In this case, there could be 100 source buckets and 50 target buckets. Other variations are possible as well.

It is also possible to perform redundant mapping, where a source bucket is mapped to more than one target bucket.

The data in the target buckets combined, can be provided as transmit data (block 555), which is transmitted to a server after further processing such as adding a header Optionally, encryption can also be performed on this transmit data. A default encryption of transmit data exists in any web app when accessed via HTTPS (Hypertext Transfer Protocol Secure).

Figures 6A, 6B:
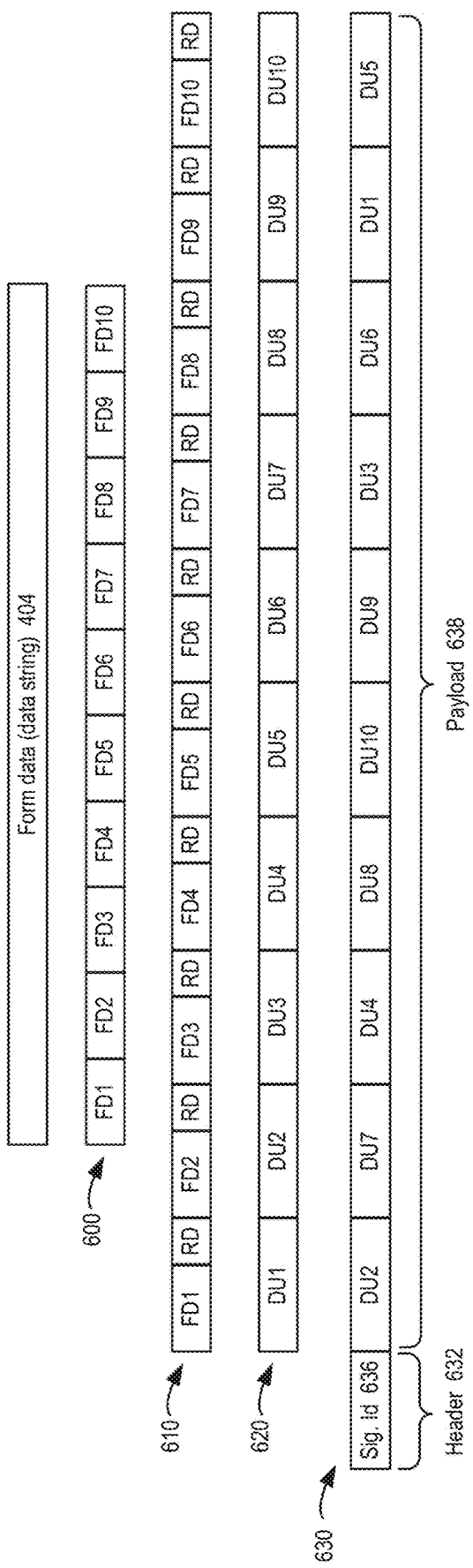
FIG. 6A depicts an example detailed implementation of the process of FIG. 5, according to some example implementations.
FIG. 6B depicts an example shuffling map, consistent with FIG. 6A, according to some example implementations.

FIG. 6A depicts an example detailed implementation of the process of FIG. 5, according to some example implementations. This example divides the form data into ten source buckets instead of the 100 source buckets of FIG. 5 for simplification. The data sequence 600 shows source buckets represented by a set of form data (FD) portions FD1-FD10. FD1-FD10 are in source buckets 1-10, respectively. Each form data portion has random data (RD) appended to it, as depicted by the data sequence 610. The random data can be a set of a predetermined number of random characters. Each form data portion and its associated random data represents a data unit (DU), such that a set of data units DU1-DU10 are provided in source buckets 1-10, respectively. DU1-DU10 are represented by the data sequence 620. DU1-DU10 can be shuffled to provide the payload 638 of a data packet 630. The data packet 630 also includes a header 632 comprising a signature id (Sig. Id) 636 (signature_unique_id). The user identifier (ID) could also be included in the header. The shuffling can be performed according to a shuffling map 650 such as depicted in FIG. 6B.

In one approach, each data unit has a same length. In an option, at least two data units of a set of data units have different lengths.

In the payload 638, the order of the data units is shuffled to: DU2, DU7, DU4, DU8, DU10, DU9, DU3, DU6, DU1, DU5.

FIG. 6B depicts an example shuffling map, consistent with FIG. 6A, according to some example implementations. The shuffling map can be requested by the user device from a server, for example, before transmitting a configuration form. The shuffling map denotes a pattern for shuffling the data units. For example, the shuffling map can identify each source bucket in order and the corresponding target bucket, e.g., in a format (1:9, 2:1, 3:7, 4:3, 5:10, 6:8, 7:2, 8:4, 9:6, 10:5). In one option, which reduces the amount of data used, the shuffling map can identify each target bucket in a sequence, where the position of the target bucket in the sequence denotes the corresponding source bucket, e.g., in a format (9, 1, 7, 3, 10, 8, 2, 4, 6, 5).

A shuffling map and a random key can be the signature the end user configures on the NMI during registration. The end user can configure any number of signatures and can subsequently edit or delete the signatures. The shuffling map can be obtained based on the following example.

Assume the target buckets are called "Target-Bucket-1, Target-Bucket-2, Target-Bucket-3, . . . Target-Bucket-100.

The value "X" in the below format is a random number in the range 1 to 100. The user can use any non-empty random string as a random key.

Bucket-1→Append random key to Bucket 1 data and put data into Target-Bucket-X bucket if empty;
Bucket-2→Append random key to Bucket 2 data and put data into Target-Bucket-X bucket if empty;
Bucket-3→Append random key to Bucket 3 data and put data into Target-Bucket-X bucket if empty;
Bucket-50→Append random key to Bucket 50 data and put data into Target-Bucket-X bucket if empty;
. . .
Bucket-98-→Append random key to Bucket 98 data and put data into Target-Bucket-X bucket if empty;
Bucket-99-→Append random key to Bucket 98 data and put data into Target-Bucket-X bucket if empty; and
Bucket-100→Append random key to Bucket 100 data and put data into Target-Bucket-X bucket if empty This shuffling bucket map and random key can form one signature of the user. A signature can have the following JSON format:

```
{
  signature_unique_id: <Time/Date of creation of signature by user>,
  map: <Shuffling bucket map explained above>,
  random_key: <Random key explained above>
}
```

FIG. 7A depicts an example process at the user computing device 210 for transforming form data into transmit data, consistent with FIGS. 1 to 6B, according to some example implementations. Step 700 includes preparing a payload comprising form data of a web application of a multi-tenant network management interface (NMI). For example, see the block 404 representing a payload of form data as depicted in FIGS. 4, 5 and 6A.

Step 701 includes, based on a user id, obtaining a signature from a server identifying a shuffling map and random data. For example, see the shuffling map 650 of FIG. 6B. The random data can be a random key of a specified bit length, for example. The server may have a random data generator circuit to generate the random key or other random data. The signature and/or random data is obtained from the server computing device or from another device.

Step 702 includes dividing the payload into portions and appending the random data to each portion to provide data units. See, e.g., the original, unshuffled data units in FIG. 6A.

Step 703 includes shuffling the data units to provide shuffled data units. See, e.g., the shuffled data units in FIG. 6A.

Step 704 includes optionally encrypting the shuffled data units. In another option, the encryption is performed after adding the header. The header could be encrypted as well as the payload.

Step 705 includes transmitting the shuffled data units with a header including a signature identifier to a server, and optionally the user id, to allow the server to execute instructions of the form data such as by configuring a network device or cloud solution. Optionally, the signature itself is included in the header, although this results in extra data being transmitted. The transmitting the shuffled data units with the signature identifier can comprise providing a packet in which the shuffled data units are in a payload of the packet and the signature identifier is in a header of the packet. In another option, the signature identifier is in the payload of a packet, such as in a predetermined position of the payload, instead of in the header. Note that the server which receives the shuffled data units can be the same as, or different than, the server which provides the signature. Generally, the user computing devices can communicate with one or more servers to perform the functions described herein.

The process can be repeated for different form submission from the same user. It is possible to use a different signature for each form submission to increases the randomness. The process can thus include obtaining different signatures for a user which identify different shuffling maps for different form data submissions, e.g., one different shuffling map for each different form data submission.

The method can include pre-configuring a plurality of signatures for a user, where the obtaining the signature in step 701 comprises selecting one of the pre-configured signatures.

Note that while step 700 refers to a multi-tenant NMI, the process can also be applied to a single-tenant NMI. A multi-tenant NMI generally involves an NMI that serves multiple user groups, where each group is an organization such as a company or a school. A single-tenant NMI generally involves an NMI that serves just one user group. Each group can have multiple users. In either case, without the techniques herein, patterns may be detectable in form data submissions and other communications from the user computing devices to a server. The techniques are applicable to any scenario in which one or more users submit form data or other communications from one or more user computing devices to a server.

Attackers prefer to perform this attack in a multi-tenant systems, which makes more sense for their attacking effort. But, they can do it on a single tenant system also if different users exist for that. The techniques described herein are applicable in this case also.

By shuffling the payloads of each user differently, and adding different random data to the payloads of different users, pattern detection can be thwarted. Similarly, pattern detection can be thwarted for a single user by shuffling different payloads of the user differently, and adding different random data to different payloads of the user.

FIG. 7B depicts an example process at the server 130 for recovering form data from transmit data, consistent with FIG. 7A, according to some example implementations. The server performs steps to recover the payload of form data. Step 710 includes receiving, from a user computing device, shuffled data units with a header including a signature id. Optionally, the signature itself is included in the header. Step 711 includes optionally decrypting the payload and/or header, using a decryption process corresponding to the encryption process. Step 712 includes identify a shuffling map based on the signature id or signature. For example, the server 130 can access its Database 236 to locate the signature having shuffling map and random key data. In one approach, the server cross-references the signature id to a shuffling map. In another approach, the server cross-references the signature id to a signature and cross-references the signature to a shuffling map.

Step 713 includes unshuffling the data units based on the shuffling map to provide unshuffled data units. Step 714 includes removing the random data from each unshuffled data unit to obtain the original form data. The random data can be discarded by the server such that it is essentially dummy data in the payload. Discarding can mean not using the random data to carry out any configuration process for a network device or cloud solution, and/or storing the random data in a memory location which is marked for deletion such as in a garbage collection process. It does not serve a purpose in the configuration form but is only a filler which acts to thwart an attacker, in one possible approach. In one approach, the server knows the size of each data unit, the size of the form data portion, the size of the random data, and the position of the random data in the data unit, e.g., either before or after the form data portion. In an example discussed previously, there were 1000 bytes in 100 buckets, with 10 bytes per bucket. Assume the random data is also 10 bytes and that the random data follows the form data in each data unit. Accordingly, each data unit will have 20 bytes of data. In the payload of a packet, the server can read the byte positions 1-10, 21-30, 41-50 and so forth to recover the form data portions while ignoring, e.g. not reading, the byte positions 11-20, 31-40, 51-60 and so forth. The server can thus read predetermined periodic byte positions or other data positions in the payload which contain form data portions (e.g., 1-10, 21-30, 41-50 and so forth) while discarding alternating predetermined periodic byte positions or other data positions in the payload which contain random data (e.g., 11-20, 31-40, 51-60 and so forth).

The ability to thwart an attacker is increased when the amount of random data is increased.

Step 715 includes executing the instructions of the form data, e.g., to configure a network device or cloud solution as specified in the configuration form as per the existing logic of the form data processing.

In an example implementation, a method at a server includes: receiving a request from a user computing device, the request comprises a user identifier and is a request for a signature; in response to the request, obtain a signature which is cross-referenced to the user identifier and transmitting the signature to the user computing device, wherein the signature identifies a shuffling map and random key data; after the transmitting, receiving from the user computing device, a packet in which shuffled data units are in a payload of the packet and the signature is in a header of the packet; retrieving the signature from the header to identify the shuffling map and random key data; and unshuffling the shuffled data units according to the shuffling map, to provide unshuffled data units.

The method may further include: receiving another request from the user computing device, the another request comprises the user identifier and is a request for a signature; and in response to the another request, obtaining a new signature which is cross-referenced to the user identifier and transmitting the new signature to the user computing device, wherein the new signature identifies a new shuffling map and random key data. Thus, the server can provide different signatures in response to different requests from the same user computing device and the same user.

In an example implementation, a method at a server includes: receiving from a first user computing device, a first packet comprising shuffled data units and a first signature or signature identifier; retrieving the first signature or signature identifier from the first packet to identify a first shuffling map; unshuffling the shuffled data units of the first packet according to the first shuffling map, to obtain a first set of data units, each data unit of the first set of data units comprising first random data and a portion of a first instance of a configuration form of a network management interface; recovering the first instance of the configuration form from the portions of the first instance of the configuration form; receiving from a second user computing device, a second packet comprising shuffled data units and a second signature or signature identifier, different than the first signature or signature identifier; retrieving the second signature or signature identifier from the second packet to identify a second shuffling map, different than the first shuffling map; unshuffling the shuffled data units of the second packet according to the second shuffling map to obtain a second set of data units, each data unit of the second set of data units comprising second random data, different than the first random data, and a portion of a second instance of the configuration form; and recovering the second instance of the configuration form from the portions of second instance of the configuration form.

Thus, a server can recover different instances of the same configuration form from different user computing devices and different users. For example, a first instance of the configuration form 300 of FIG. 3 can be used to configure a first network device or cloud solution, and a second instance of the configuration form 300 of FIG. 3 can be used to configure a second network device or cloud solution.

The method may further include: receiving from the first user computing device, a third packet comprising shuffled data units and a third signature or signature identifier; retrieving the third signature or signature identifier from the third packet to identify a third shuffling map; unshuffling the shuffled data units of the third packet according to the third shuffling map, to obtain a third set of data units, each data unit of the third set of data units comprising third random data and a portion of a third instance of the configuration form; and recovering the third instance of the configuration form from the portions of the third instance of the configuration form.

Thus, a server can recover different instances of the same configuration form from different the same user computing device and the same user. For example, a user may use a first instance of the configuration form 300 of FIG. 3 to configure a first network device or cloud solution, and a second instance of the configuration form 300 of FIG. 3 to configure a second network device or cloud solution.

Figure 8:
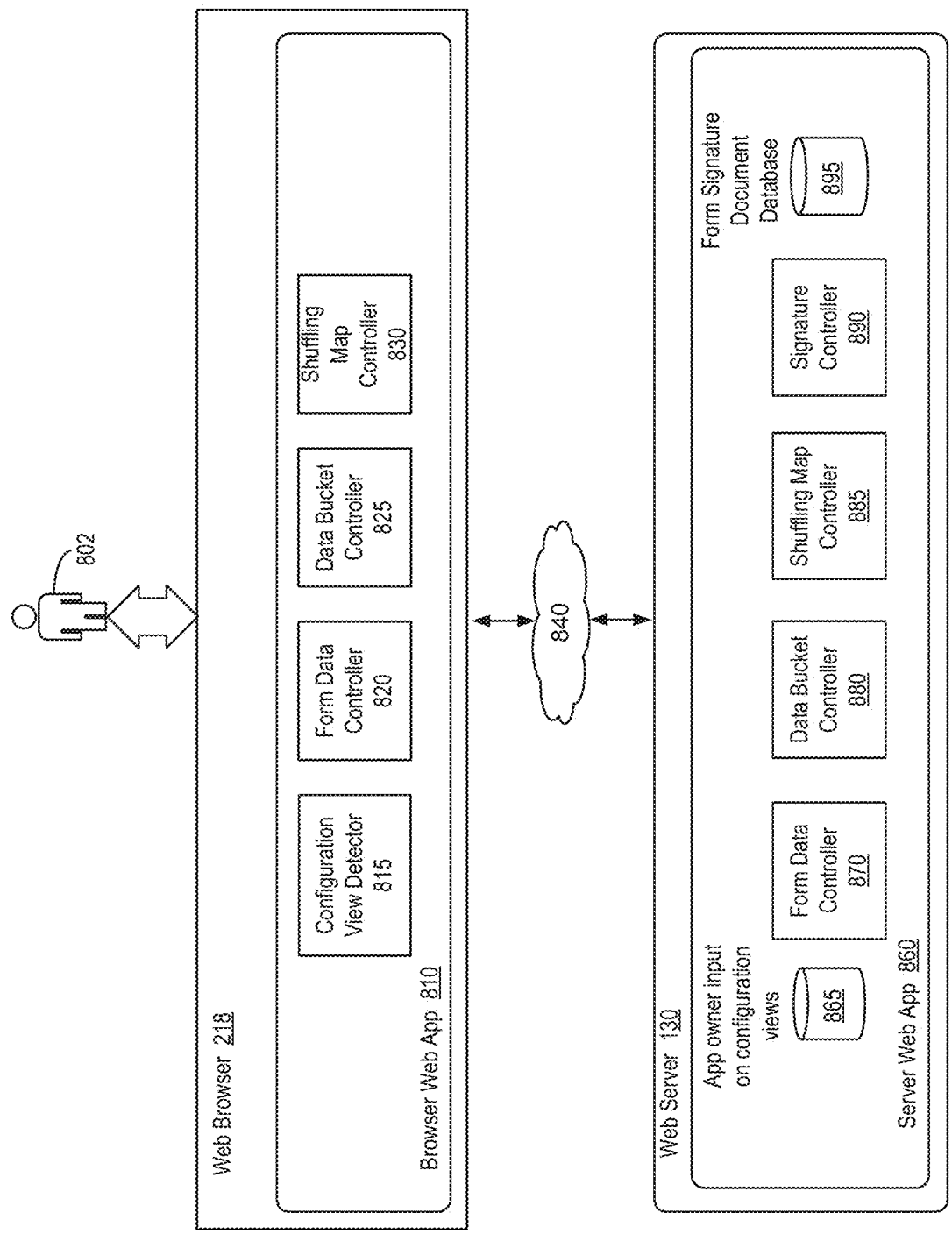
FIG. 8 depicts an example implementation of the Web Browser 218 and the Web Server 130 of FIG. 2, according to some example implementations.

FIG. 8 depicts an example implementation of the Web Browser 218 and the Web Server 130 of FIG. 2, according to some example implementations. A user 802 interacts with the Web Browser such as via a display and input devices, e.g., keyboard or mouse, of a computing device. The Web Browser includes the Browser Web App 810, e.g., a web app in the Web Browser. The Browser Web App 810 includes a Configuration View Detector 815, a Form Data Controller 820, a Data Bucket Controller 825 and a Shuffling Map Controller 830. The Configuration View Detector 815 can detect when the user is interacting with a configuration view of an NMI which is to be processed as described herein. An example configuration view is in FIG. 3. The Form Data Controller 820 converts a form which is provided by the view, e.g., in JSON format, to a data string, such as depicted in FIG. 4. The Data Bucket Controller 825 can divide the form data into source buckets, such as discussed in connection with FIG. 5. The Shuffling Map Controller 830 shuffles the source buckets, such as discussed in connection with FIGS. 5, 6A and 6B, based on a shuffling map.

The Web Browser communicates with the Web Server 130 via a network 840. The Web Server 130 includes a Database 865 which represents an application (app) owner input on configuration views, a Form Data Controller 870, a Data Bucket Controller 880, a Shuffling Map Controller 885, a Signature Controller 890 and a Database 895 for form signatures. The NMI/app owners can provide input on the views, specific fields and field types which are stored in the Database 865. The Form Data Controller 870 is a counterpart of the Form Data Controller 820 at the Web Browser client side web app, and processes data received from the Data Bucket Controller 880. The Data Bucket Controller 880 can assemble data from the target buckets and is a counterpart of the Data Bucket Controller 825 at the Web Browser client side web app.

The Shuffling Map Controller 885 unshuffles the data units, and is a counterpart of the Shuffling Map Controller 830. The Signature Controller 890 can handle requests for signatures from the client side web app, by fetching from the Database 895.

Each user can have any number of signatures. Moreover, users can have the option to edit existing signatures and delete any of the existing signatures. In one approach, all of the configured signatures are stored on the server side in the document Database 895. When any user registers with a multi-tenant NMI, signatures can be added by the end user with the help of the Signature Controller 890 on the server side.

On the client side, each time form submission occurs, the solution automatically detects this using the Form Data Controller 820. Before calling the endpoint for the actual transaction, the following steps occur.

First the Shuffling Map Controller 830 transmits a request to the server side for one of the signatures. The server sends one of the signatures very randomly from the existing list of user's configured signatures. The client side converts the form data JSON payload into a string { . . . }. It removes the first "{" and last "}" and converts the remaining code to string data. This data can be placed into a set of source buckets by the Data Bucket Controller 825, along with appending a random key data. The data will be shuffled to the target buckets based on the signature by the Shuffling Map Controller 830. All the contents in the target buckets will be appended and form anew payload. The brace symbols "{" and "}" will be added back to create the final payload: {new shuffled payload with random key}.

The Form Data Controller 820 will take this new payload and proceed to submit it to the actual endpoint (REST/API) along with the signature_unique_id as a header parameter for the request to the server. The data posted to the server side may be with existing encryption or without encryption based on whether HTTP (Hypertext Transfer Protocol) or HTTPS (Hypertext Transfer Protocol Secure) traffic, respectively, is used. Since the form data is randomized, it is impossible for an attacker to perform a deep inspection of the packets and identify clusters of users. Even if the same form is submitted again with identical data, the attacker won't be able to detect a pattern since the packet pattern will be totally different due to shuffling and the changing random key.

On the server side, the endpoint will receive the form submitted payload. The application control will move to the Form Data Controller 870 on the server side. Using signature_unique_id, it retrieves the user's specific signature from the Form Signature Document Database 895. Then, using the shuffling map, the server side Shuffling Map Controller 885 reverses the shuffling. Also, the random key appended on the client side will be removed from the data. All the reversed data buckets will be combined to form the original form data payload. The form data will be used further as per the application logic such as by carrying out a configuration based on the form data In multi-tenant systems, different users can configure their own signatures in random ways as desired using the Signature Controller 890 on the server side. Also, the users can keep modifying the signatures via an edit option. Due to this, it will be impossible for attackers to study patterns by deep inspection of the packets (encrypted or unencrypted). This saves all the users from information disclosure while submitting form data. Since there is no information disclosure, attackers cannot know what each user has configured and cannot perform any targeted attacks based on configurations done in the NMIs.

The components of the Web Browser 218 and the Web Server 130 can represent software and/or hardware. The functions of the components are discussed further in connection with FIGS. 9A to 9C, which provide three parts of a sequence diagram. These are typical sequences involved in the total solution. The total solution depicted is a generic solution.

This proposed solution thus includes components on the server side and client side. By default, the solution supports any configuration forms submission made by the end user. If the app owner wants support only for specific configuration views, the app owner provides information about the views in the Database 865. The input from the web app owners can be in a JSON format such as depicted below. If the app owner does not provide the below input or configures an empty JSON array [ ], then the solution is applied to all configuration form submission. An example of the JSON format is:

```
[
  {
    configuration_view_form_id: <Id or path to identify
    the configuration form>
  },
  {
    configuration view form id: <Id or path to identify
```

```
    the configuration form>
  },
  ... ...
  ... ...
]
```

The web app client side Configuration View Detector 815 detects the intended configuration view forms as per input from the web app owner or all the configuration view forms automatically. The form submission data payload will be randomized before calling the server endpoint (REST/API etc. endpoints). This is done using the client side component Form Data Controller 820. The actual web app form data payload will be intercepted by this component for processing, for example via techniques such as overriding XMLHttpRequest. XMLHttpRequest is an API in the form of an object whose methods transfer data between a web app in web browser and a web server. The object is provided by the browser's JavaScript environment.

Figure 9A:
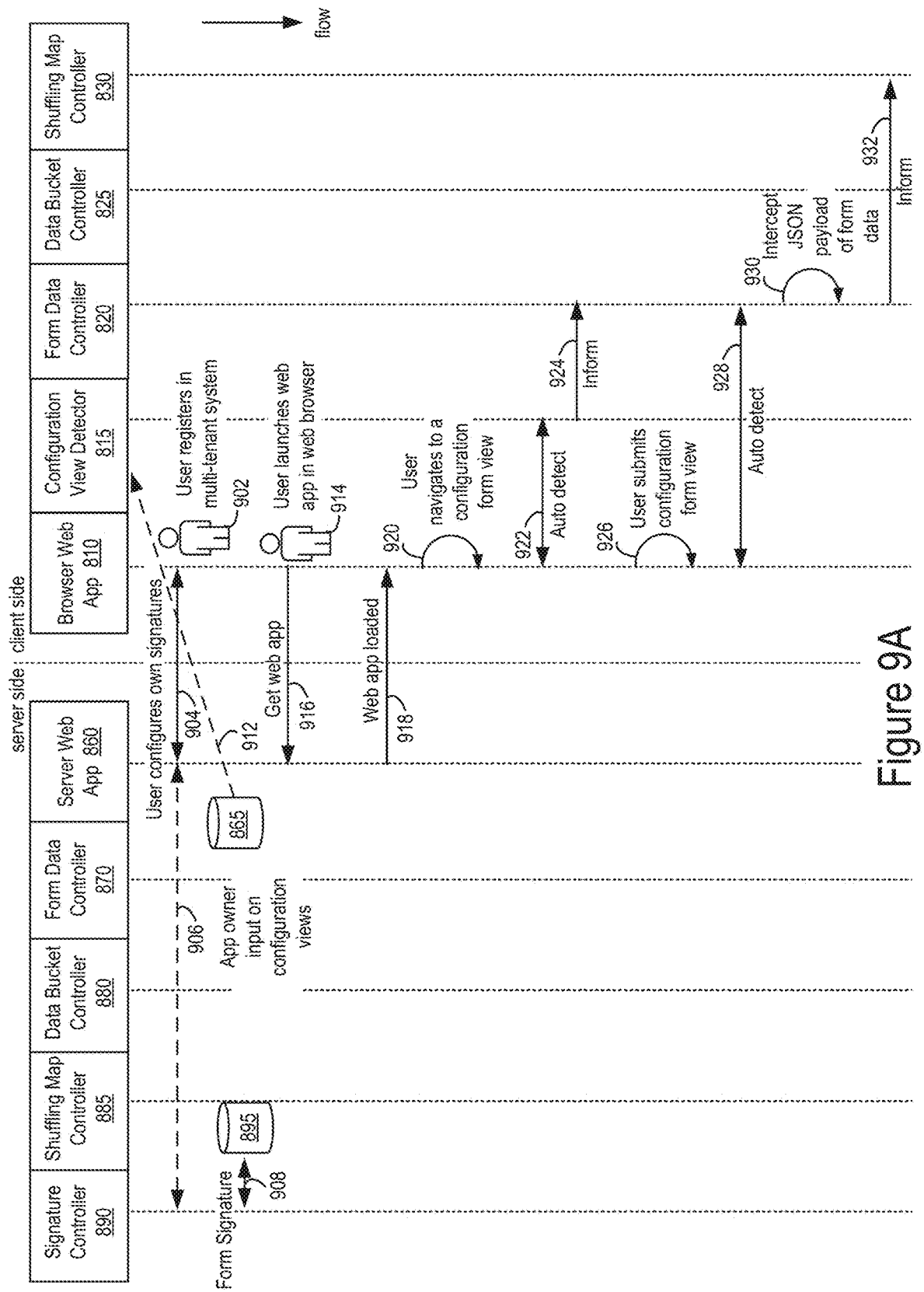
FIG. 9A depicts a first part of an example process flow, consistent with FIGS. 1 to 8, according to some example implementations.
Figure 9B:
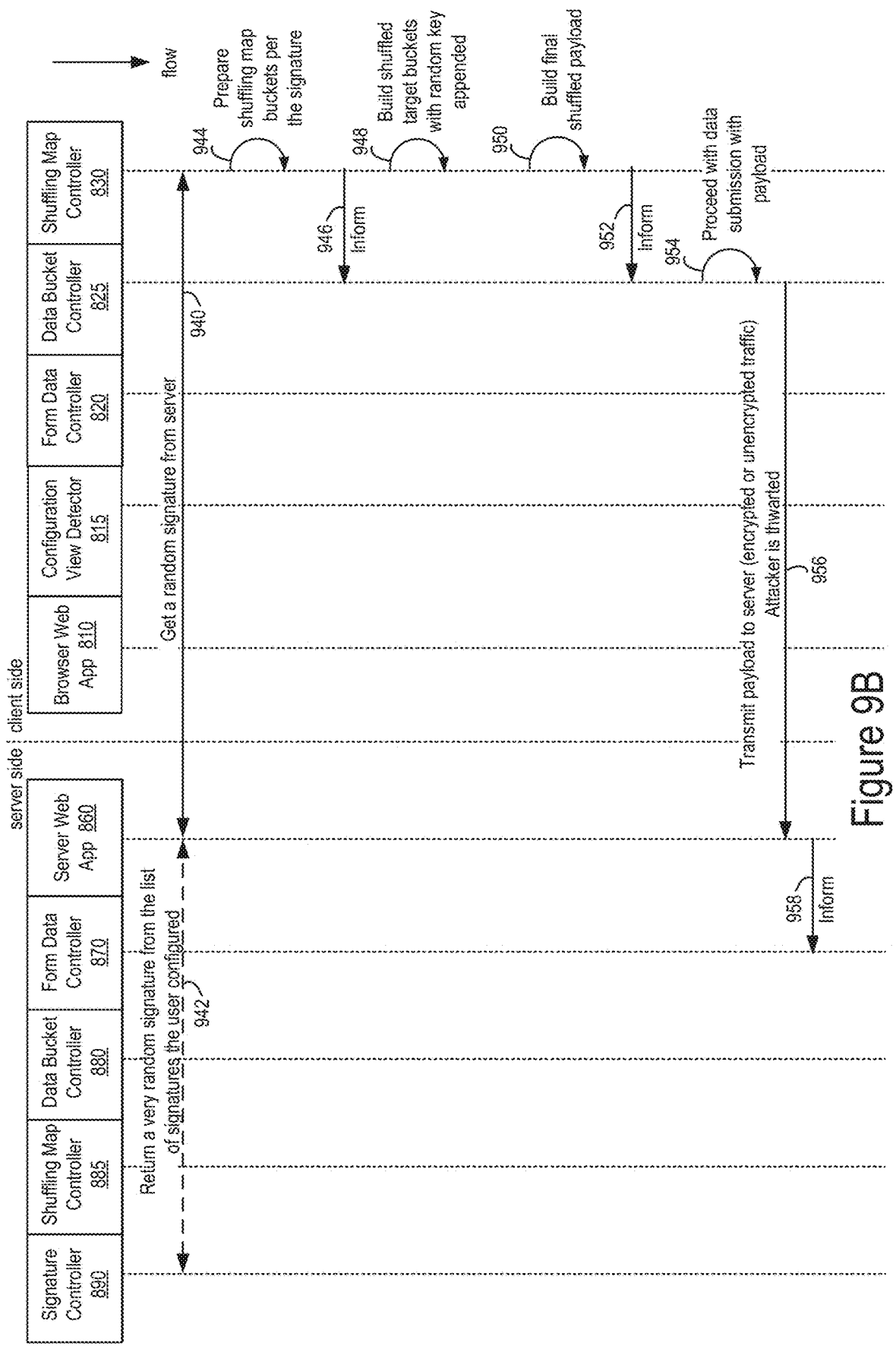
FIG. 9B depicts a second part of an example process flow, following FIG. 9A, according to some example implementations.

In FIGS. 9A to 9C, the flow proceeds in the direction indicated, the vertical dashed lines denote which components of FIG. 8 are involved, and the components are in the Web Browser 218/client side or the Web Server 130/server side as indicated.

FIG. 9A depicts a first part of an example process flow, consistent with FIGS. 1 to 8, according to some example implementations. Initially, a user 902 registers in a multi-tenant system. The user configures signatures, in which the user communicates with the Server Web App 860 (arrow 904), and the Server Web App communicates with the Signature Controller 890 (arrow 906). The Signature Controller 890 communicates with the Form Signature Document Database 895 (arrow 908) to store signatures for the user, e.g., cross-referenced to a user id.

Separately, the app owner provides input on the configuration views in the Database 865 for use by the Configuration View Detector (arrow 912).

Subsequently, the user 914 launches a web app in a Web Browser. The Browser Web App gets the web app from the Server Web App (arrow 916) and the web app is loaded to the Browser Web App (arrow 918). At the Browser Web App, the user navigates to a configuration form view (arrow 920), such as in FIG. 3. The Configuration View Detector 815 automatically detects that the configuration form view is being accessed (arrow 922), and informs the Form Data Controller 820 (arrow 924). The user submits the configuration form view (arrow 926), and this is automatically detected by the Form Data Controller 820 (arrow 928). The Form Data Controller 820 intercepts the JSON payload of the form data (arrow 930) and informs the Shuffling Map Controller 830 (arrow 932).

FIG. 9B depicts a second part of an example process flow, following FIG. 9A, according to some example implementations. Thus Shuffling Map Controller 830 gets a random signature from the server by communicating with the Server Web App 860 (arrow 940), which in turn communicates with the Signature Controller 890 (arrow 942). The Signature Controller 890 randomly returns a signature from the list of signatures the user previously configured. The Shuffling Map Controller 830 then prepares the shuffling map buckets per the signature (arrow 944), and informs the Data Bucket Controller 825 (arrow 946). The Shuffling Map Controller 830 then builds the shuffled target buckets with a random key appended to each data unit (arrow 948), builds the final shuffled payload (arrow 950), and informs the Data Bucket Controller 825 (arrow 952).

The Data Bucket Controller 825 proceeds with the data submission with the payload (arrow 954). In particular, the Data Bucket Controller 825 transmits the payload to the Server Web App 860, as encrypted or unencrypted traffic, thereby thwarting an attacker (arrow 956), and the Server Web App 860 informs the Form Data Controller 870 (arrow 958).

FIG. 9C depicts a third part of an example process flow, following FIG. 9B, according to some example implementations. The Form Data Controller 870 gets the shuffled payload data (arrow 960) and communicates with the Data Bucket Controller 880 in a process (arrow 962). The Data Bucket Controller 880 communicates with the Shuffling Map Controller 885 (arrow 964) to get signature information and process the shuffled data with the random key. The Data Bucket Controller 880 then builds the reversed payload target buckets (arrow 966), and rebuilds the original payload by combining the data in the target buckets and omitting the random data (arrow 968). The Data Bucket Controller 880 informs the Form Data Controller 870 when these tasks are completed (arrow 970), in response to which the Form Data Controller 870 continues the application logic on the original form payload (arrow 972). This can involve, e.g., carrying out configuration instructions on a network device/cloud solution using data input by the user in the configuration form.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read-only memory (ROM), Flash memory, phase change memory, solid state drives (SSDs) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 10:
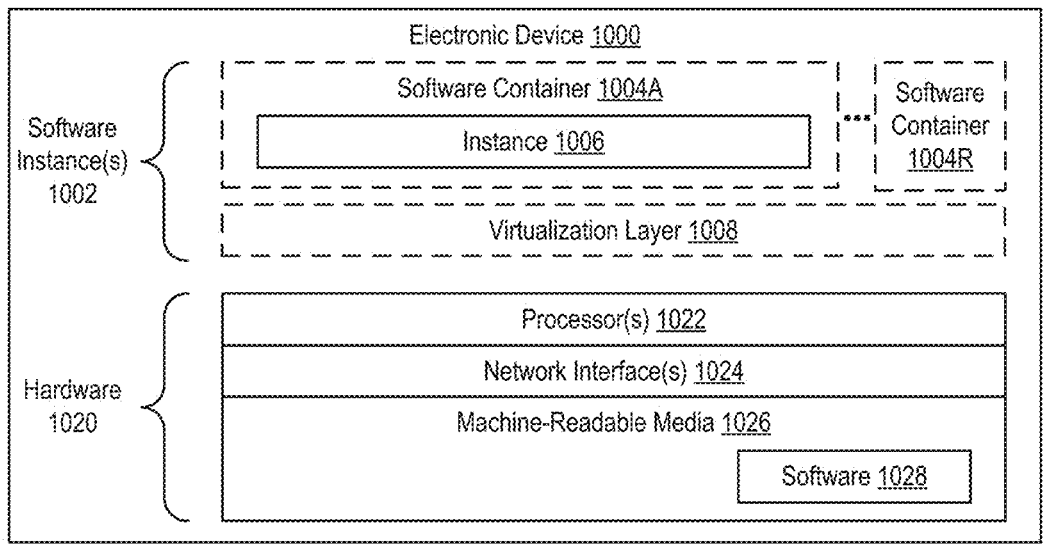
FIG. 10 is a block diagram of a deployment environment according to some example implementations.

FIG. 10 is a block diagram illustrating an electronic device 1000 according to some example implementations. One or more of such electronic devices can host the processes and components depicted in FIGS. 1 and 2, including the user computing devices and the server.

FIG. 10 includes hardware 1020 comprising a set of one or more processor(s) 1022, a set of one or more network interfaces 1024 (wireless and/or wired), and machine-readable media 1026 having stored therein software 1028 (which includes instructions executable by the set of one or more processor(s) 1022). The machine-readable media 1026 may include non-transitory and/or transitory machine-readable media. Each of the previously described user computing devices and servers and the process for thwarting attackers may be implemented in one or more electronic devices 1000. In one implementation: 1) each of the user computing devices and servers is implemented in a separate one of the electronic devices 1000 (e.g., in end user devices where the software 1028 represents the software to implement clients to interface directly and/or indirectly with the process for thwarting attackers (e.g., software 1028 represents a web browser, a native client, a portal, a command-line interface, and/or an application programming interface (API) based upon protocols such as Simple Object Access Protocol (SOAP), Representational State Transfer (REST), etc.); 2) the process for thwarting attackers is implemented in a separate set of one or more of the electronic devices 1000 (e.g., a set of one or more server devices where the software 1028 represents the software to implement the process for thwarting attackers); and 3) in operation, the electronic devices implementing the user computing devices and servers and the process for thwarting attackers would be communicatively coupled (e.g., by a network) and would establish between them (or through one or more other layers and/or or other services) connections for communicating data. Other configurations of electronic devices may be used in other implementations (e.g., an implementation in which the user computing device and the process for thwarting attackers are implemented on a single one of electronic device 1000).

During operation, an instance of the software 1028 (illustrated as instance 1006 and referred to as a software instance; and in the more specific case of an application, as an application instance) is executed. In electronic devices that use compute virtualization, the set of one or more processor(s) 1022 typically execute software to instantiate a virtualization layer 1008 and one or more software container(s) 1004A-1004R (e.g., with operating system-level virtualization, the virtualization layer 1008 may represent a container engine (such as Docker Engine by Docker, Inc. or rkt in Container Linux by Red Hat, Inc.) running on top of (or integrated into) an operating system, and it allows for the creation of multiple software containers 1004A-1004R (representing separate user space instances and also called virtualization engines, virtual private servers, or jails) that may each be used to execute a set of one or more applications; with full virtualization, the virtualization layer 1008 represents a hypervisor (sometimes referred to as a virtual machine monitor (VMM)) or a hypervisor executing on top of a host operating system, and the software containers 1004A-1004R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1028 is executed within the software container 1004A on the virtualization layer 1008. In electronic devices where compute virtualization is not used, the instance 1006 on top of a host operating system is executed on the "bare metal" electronic device 1000. The instantiation of the instance 1006, as well as the virtualization layer 1008 and software containers 1004A-1004R if implemented, are collectively referred to as software instance(s) 1002.

Alternative implementations of an electronic device may have numerous variations from that described above. For example, customized hardware and/or accelerators might also be used in an electronic device.

Example Environment

Figure 11:
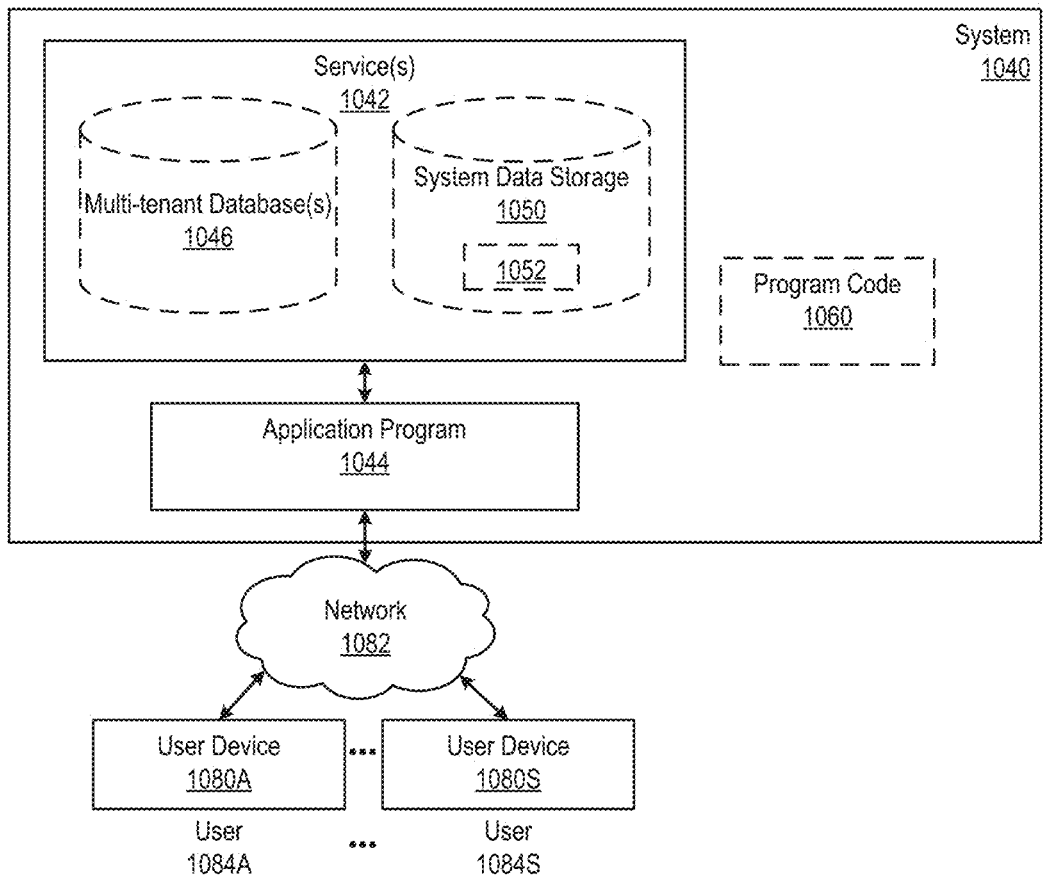
FIG. 11 is a block diagram of a deployment environment according to some example implementations.

FIG. 11 is a block diagram of a deployment environment according to some example implementations. A system 1040 includes hardware (e.g., a set of one or more server devices) and software to provide service(s) 1042, including the process for thwarting attackers. In some implementations the system 1040 is in one or more datacenter(s). These datacenter(s) may be: 1) first party datacenter(s), which are datacenter(s) owned and/or operated by the same entity that provides and/or operates some or all of the software that provides the service(s) 1042; and/or 2) third-party datacenter(s), which are datacenter(s) owned and/or operated by one or more different entities than the entity that provides the service(s) 1042 (e.g., the different entities may host some or all of the software provided and/or operated by the entity that provides the service(s) 1042). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1040 is coupled to user devices 1080A-1080S over a network 1082. The service(s) 1042 may be on-demand services that are made available to one or more of the users 1084A-1084S working for one or more entities other than the entity which owns and/or operates the on-demand services (those users sometimes referred to as outside users) so that those entities need not be concerned with building and/or maintaining a system, but instead may make use of the service(s) 1042 when needed (e.g., when needed by the users 1084A-1084S). The service(s) 1042 may communicate with each other and/or with one or more of the user devices 1080A-1080S via one or more APIs (e.g., a REST API). In some implementations, the user devices 1080A-1080S are operated by users 1084A-1084S, and each may be operated as a client device and/or a server device. In some implementations, one or more of the user devices 1080A-1080S are separate ones of the electronic device 1000 or include one or more features of the electronic device 1000.

In some implementations, the system 1040 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 1040 is a multi-tenant cloud computing architecture supporting multiple services, such as one or more of the following types of services: process for thwarting attackers; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 1040 may include an application platform 1044 that enables PAAS for creating, managing, and executing one or more applications developed by the provider of the application platform 1044, users accessing the system 1040 via one or more of user devices 1080A-1080S, or third-party application developers accessing the system 1040 via one or more of user devices 1080A-1080S.

In some implementations, one or more of the service(s) 1042 may use one or more multi-tenant databases 1046, as well as system data storage 1050 for system data 1052 accessible to system 1040. In certain implementations, the system 1040 includes a set of one or more servers that are running on server electronic devices and that are configured to handle requests for any authorized user associated with any tenant (there is no server affinity for a user and/or tenant to a specific server). The user devices 1080A-1080S communicate with the server(s) of system 1040 to request and update tenant-level data and system-level data hosted by system 1040, and in response the system 1040 (e.g., one or more servers in system 1040) automatically may generate one or more Structured Query Language (SQL) statements (e.g., one or more SQL queries) that are designed to access the desired information from the multi-tenant database(s) 1046 and/or system data storage 1050.

In some implementations, the service(s) 1042 are implemented using virtual applications dynamically created at run time responsive to queries from the user devices 1080A-1080S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1060 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1044 includes an application setup mechanism that supports application developers' creation and management of applications, which may be saved as metadata by save routines. Invocations to such applications, including the process for thwarting attackers, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1082 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1040 and the user devices 1080A-1080S.

Each user device 1080A-1080S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1040. For example, the user interface device can be used to access data and applications hosted by system 1040, and to perform searches on stored data, and otherwise allow one or more of users 1084A-1084S to interact with various GUI pages that may be presented to the one or more of users 1084A-1084S. User devices 1080A-1080S might communicate with system 1040 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1080A-1080S might include an HTTP client, commonly referred to as a "browser," for sending and receiving HTTP messages to and from server(s) of system 1040, thus allowing users 1084A-1084S of the user devices 1080A-1080S to access, process and view information, pages and applications available to it from system 1040 over network 1082.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. An apparatus, comprising:
   one or more processors; and
   a non-transitory machine-readable storage medium that provides instructions that, if executed by the one or more processors, are configurable to cause the apparatus to perform operations comprising:
   preparing a payload comprising form data of a web application of a multi-tenant network management interface;
   obtaining a signature comprising a shuffling map and random data;
   dividing the payload into portions and appending the random data to each portion to provide a set of data units, wherein each data unit of the set of data units comprises one of the portions and the appended random data;
   shuffling the data units to provide shuffled data units, according to the shuffling map; and
   transmitting the shuffled data units with the signature or an identifier of the signature to a server.

2. The apparatus of claim 1, wherein the form data is to configure a network device or cloud solution.

3. The apparatus of claim 1, wherein the obtaining the signature comprises transmitting a request comprising a user identifier to the server.

4. The apparatus of claim 1, wherein the random data is the same for each data unit of the set of data units.

5. The apparatus of claim 1, wherein the random data is different for at least two data units of the set of data units.

6. The apparatus of claim 1, wherein the random data is dummy data to be discarded by the server.

7. The apparatus of claim 1, wherein the random data comprises a random key.

8. The apparatus of claim 1, wherein the transmitting the shuffled data units with the signature or the identifier of the signature comprises providing a packet in which the shuffled data units are in a payload of the packet and the signature or the identifier of the signature is in a header of the packet.

9. The apparatus of claim 1, wherein code of the form data is in JavaScript Object Notation, and the preparing the payload comprises converting the code to a data string.

10. The apparatus of claim 1, wherein the operations performed further comprise obtaining different signatures for a user which identify different shuffling maps for different form data submissions.

11. The apparatus of claim 1, wherein the operations performed further comprise pre-configuring a plurality of signatures for a user, and the obtaining the signature comprises selecting one of the pre-configured signatures.

12. A non-transitory machine-readable storage medium that provides instructions that, if executed by a set of one or more processors, are configurable to cause the set of one or more processors to perform operations comprising:
  receiving a request for a signature from a user computing device, wherein the request comprises a user identifier;
  in response to the request, obtaining the signature which is cross-referenced to the user identifier and transmitting the signature to the user computing device, wherein the signature comprises a shuffling map;
  after the transmitting, receiving from the user computing device, a packet in which shuffled data units are in a payload of the packet and the signature or an identifier of the signature is in a header of the packet;
  retrieving the signature or the identifier of the signature from the header to identify the shuffling map; and
  unshuffling the shuffled data units according to the shuffling map, to provide unshuffled data units.

13. The non-transitory machine-readable storage medium of claim 12, wherein the operations performed further comprise:
  receiving another request for a new signature from the user computing device, wherein the another request comprises the user identifier; and
  in response to the another request, obtaining the new signature which is cross-referenced to the user identifier and transmitting the new signature to the user computing device, wherein the new signature identifies a new shuffling map.

14. The non-transitory machine-readable storage medium of claim 12, wherein the signature comprises random data, and each unshuffled data unit comprises the random data appended to a portion of form data, and the operations further comprise reading the portions of form data and discarding the appended random data.

15. The non-transitory machine-readable storage medium of claim 14, wherein the form data is from a web application of a network management interface.

16. The non-transitory machine-readable storage medium of claim 14, wherein the operations performed further comprise recovering the portions of form data from predetermined periodic byte positions in the payload.

17. A method, comprising:
  receiving from a first user computing device, a first packet comprising shuffled data units and a first signature or signature identifier;
  identifying a first shuffling map based on the first signature or signature identifier;
  unshuffling the shuffled data units of the first packet according to the first shuffling map, to obtain a first set of data units, each data unit of the first set of data units comprising first random data and a portion of a first instance of a configuration form of a network management interface;
  recovering the first instance of the configuration form from the portions of the first instance of the configuration form;
  receiving from a second user computing device, a second packet comprising shuffled data units and a second signature or signature identifier, different than the first signature or signature identifier;
  identifying a second shuffling map, different than the first shuffling map, based on the second signature or signature identifier;
  unshuffling the shuffled data units of the second packet according to the second shuffling map to obtain a second set of data units, each data unit of the second set of data units comprising second random data, different than the first random data, and a portion of a second instance of the configuration form; and
  recovering the second instance of the configuration form from the portions of the second instance of the configuration form.

18. The method of claim 17, further comprising discarding the first random data and the second random data.

19. The method of claim 17, further comprising:
  executing instructions of the first instance of the configuration form to configure a first network device or cloud solution; and
  executing instructions of the second instance of the configuration form to configure a second network device or cloud solution, different than the first network device or cloud solution.

20. The method of claim 17, further comprising:
  receiving from the first user computing device, a third packet comprising shuffled data units and a third signature or signature identifier;
  identifying a third shuffling map, different than the first and second shuffling maps based on the third signature or signature identifier;
  unshuffling the shuffled data units of the third packet according to the third shuffling map, to obtain a third set of data units, each data unit of the third set of data units comprising third random data and a portion of a third instance of the configuration form; and
  recovering the third instance of the configuration form from the portions of the third instance of the configuration form.

* * * * *